United States Patent Office 3,478,152
Patented Nov. 11, 1969

---

3,478,152
CADMIUM CONTAINING COMPOUNDS AS INSECT CONTROL AGENTS
Lyle D. Goodhue, Bartlesville, Okla., assignor to Phillips Petroleum Company, a corporation of Delaware
No Drawing. Filed July 11, 1966, Ser. No. 563,977
Int. Cl. A01n *9/12;* C07f *3/08*
U.S. Cl. 424—287                    2 Claims

ABSTRACT OF THE DISCLOSURE

Selected cadmium compounds from alkyl- and hydroxyalkyl mercaptides, organic and inorganic salts of cadmium and pinanyl mercaptides are effective biological system control agents for arthropods for killing in inhibiting reproduction of arthropods.

---

This invention relates to a method for combatting arthrapods.

In another aspect, the invention relates to a method for combatting arthropods comprising subjecting the arthropods to the action of cadmium containing compounds. In another of it aspects, the invention relates to a method for combatting arthropods wherein the arthropods ingest the cadimum containing compound. In still another aspect, the invention relates to a method for combatting arthropods wherein said arthropods come into contact with an area treated with a cadmium containing compound.

Effective methods of controlling pestiferous arthropods, including members of the class Hexapoda, Arachida, and the like are of considerable utility. Each year insects and other arthropods cause tremendous losses of food production. Losses of stored grain and damage to buildings is measured in millions of dollars. Perhaps the greatest loss caused is in suffering and lost productivity of people affected by diseases such as yellow fever, malaria, and the like which are carried by certain species of arthropods. Other arthropods inflict injuries on domestic animals, plants, and clothing. These are only a few of the examples of the detrimental effects caused by arthropods. It is an object of this invention to kill pestiferous arthropods. It is also an object of this invention to inhibit the reproduction of pestiferous arthropods by chemical sterilization and by prevention of egg laying. It is also an object of the invention to repel pestiferous arthropods from areas in which they are found. Other objects include preventing the feeding of pestiferous arthropods and interfering with their molting process.

Other aspects, objects, and the several advantages of the invention will be apparent to one skilled in the art upon studying the specification and appended claims.

In accordance with the invention, a method is provided for combatting arthropods comprising subjecting the arthropods to the action of a cadmium containing compound. Cadmium containing compounds effective in the practice of this invention include certain cadmium alkyl- and cadmium hydroxy alkyl mercaptides, certain inorganic salts of cadmium, certain organic salts of cadmium, and cadmium pinanyl mercaptide compositions. The effectiveness of the cadmium compounds is determined by the structure of the non-cadmium moiety and is not inherent in the cadmium content per se.

The effective cadmium pinanyl mercaptide compositions, as referred to in this disclosure, comprise one or more of the following compounds:

$Z^1$—Cd—$Z^2$ where $Z^1$ and $Z^2$ can be chosen from the following structures:

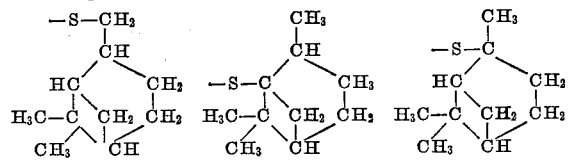

The effective cadmium alkyl- and cadmium hydroxyl alkyl mercaptides have the general formula

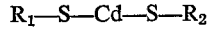

$$R_1\text{—S—Cd—S—}R_2$$

where $R_1$ and $R_2$ are selected from the group consisting of normal (straight chain) alkyl radicals containing from 1 to 10 carbon atoms, and monohydroxy-n-alkyl radicals containing from 1 to 12 carbon atoms, said hydroxy group on one of the three carbon atoms nearest the sulfur atom.

Examples of effective cadmium alkyl- and cadmium hydroxy alkyl mercaptides are: cadmium 2-hydroxyethyl mercaptide, cadmium n-octyl mercaptide, cadmium ethyl mercaptide, cadmium n-decyl mercaptide, cadmium 3-hydroxydodecyl mercaptide, and cadmium 1-hydroxypentyl mercaptide.

Another group of cadmium containing compounds effective in the practice of this invention includes certain inorganic salts of cadmium, including cadmium nitrate, cadmium phosphate, cadmium sulfate, and cadmium chloride.

Still another group of effective cadmium containing compounds useful in the practice of the invention have the general formula

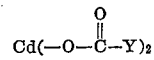

$$Cd(-O-\overset{O}{\underset{\|}{C}}-Y)_2$$

which are generally known as cadmium salts of monocarboxylic acids. In the general formula Y is selected from the group consisting of hydrogen, n-alkyl, n-alkenyl, n-alkadienyl, n-alkynyl, and unbranched combinations thereof having up to and including 30 carbon atoms. Examples of these compounds include cadmium stearate, cadmium laurate, cadmium formate, cadmium octacosanate, cadmium 2,8-decadiene-4,6-diynate, cadmium 3-butenate, and cadmium sorbate.

The cadmium containing compounds of the invention are most effective when ingested by the arthropods or when the arthropods come in contact with an area which has been treated with one of the compounds of the invention. The compounds may be used alone or in various formulations with other substances. Amounts needed for lethal effects vary with the species of arthropod, the physiological state of the arthropod, the cadmium containing compound or compounds chosen, and other factors such as temperature, humidity, and the like. Generally, however, treatments of from 0.01 to 1000 mg. of cadmium containing compound per kg. of arthropod body weight are preferred. Amounts needed for inhibition of reproduction can be smaller.

When used to combat arthropods by contacting therewith, the cadmium containing compounds of the invention can be applied by conventional techniques such as spraying, dusting and fogging. The compounds are formulated by methods well known to the art, such as dissolving, emulsifying, or formulating them as dusts, wettable powders, baits, or the like. In addition, the cadmium containing compounds can be combined with other pest control agents. The compounds can be used to prevent damage to wool, fabrics, domestic animals, and clothing.

The following examples illustrate both methods of killing arthropods, and methods of interfering with their life processes.

Example I

A number of cadmium containing compounds were contacted with Drosophila by the following method: Each was very lightly dusted into each of a series of 4 dram vials. All excess compound was removed in each case so that only a very thin layer was left in the bottom of each vial. Into each of the vials were introduced 5 pairs of Drosophila melangaster (essentially homozygous, wild type) that had been lightly anesthetized. The Drosophila were allowed to crawl in the respective vials for 10 minutes and then transferred by allowing them to crawl to standard rearing medium in an 8 dram vial. The insects were then watched under a microscope to determine the extent of feeding and/or egg laying. The eggs were then observed to see if they were fertile. Examples of compounds of this invention, cadmium 2-hydroxyethyl mercaptide and cadmium n-octyl mercaptide, produced 60 to 100% mortality of the treated insects, the amount of mortality being directly proportional to the amount of crawling done by the insects while in the vials containing the compounds. The survivors refused to feed and laid no eggs. However, other cadmium containing compounds such as cadmium 2,9 p-menthane mercaptide, cadmium-2-ethylhexoate, cadmium t-octyl mercaptide, cadmium t-dodecyl mercaptide, cadmium n-dodecyl mercaptide, and cadmium cyclopentamethylene dithiocarbamate produced no observable effect on the Drosophila.

Example II

Drosophila were treated with cadium 2-hydroxyethyl mercaptide and cadmium n-octyl mercaptide in the same manner as in Example I except the inserts were allowed to crawl in the treated vials for only 5 minutes before being allowed to crawl into vials containing standard rearing medium. Mortality was considerably less in this case, but the insects still refused to feed or lay eggs. This run was repeated except that the insects were transferred to a second vial containing standard medium after being allowed to crawl for 5 minutes in the first vial containing medium. Mortality was still lower. However, Drosophila treated with cadmium 2-hydroxyethyl mercaptide still refused to lay eggs or feed. Those Drosophila treated with cadmium n-octyl mercaptide fed to a slight degree and laid some eggs which were not fertile.

Example III

The compounds of Example I were each inoculated into a coxatrochanteral joint of different specimens of Perniplaneta americana, the American roach. Cadmium n-octyl mercaptide and cadmium 2-hydroxyethyl mercaptide were lethal at higher doses. At lower doses egg laying was reduced, eggs did not hatch; hyperplasia was noted at the point of contact, and molting was prevented. No effects were noted with cadmium 2,9-p-menthane mercaptide, cadmium 2-ethylhexoate, cadmium t-octyl mercaptide, cadmium t-dodecylmercaptide, cadmium n-dodecyl mercaptide, or cadmium cyclopentamethylene dithiocarbamate.

Example IV

The compounds of Example I were each applied in varying doses to dog food. Respective groups of German roaches (Blattella germania) were then allowed to feed on each of the treated baits. Cadmium n-octyl mercaptide and cadmium 2-hydroxyethyl mercaptide were lethal at higher concentrations and reduced egg laying and feeding at lower levels. Eggs laid were largely infertile. No effects were noted with cadmium 2,9-p-menthane mercaptide, cadmium 2-ethylhexoate, cadmium t-octyl mercaptide, cadmium t-dodecyl mercaptide, cadmium n-dodecyl mercaptide, or cadmium cyclopentamethylene dithiocarbamate.

Example V

The compounds of Example I were each mixed in the food provided for respective groups of caged houseflies (Musca domestica). Cadmium n-octyl mercaptide and cadmium 2-hydroxyethyl mercaptide prevented feeding at higher concentrations. At lower concentrations feeding was reduced, fewer eggs were laid and infertility of the eggs laid was noted. No effects were noted with cadmium 2,9-p-methane mercaptide, cadmium 2-ethylhexoate, cadmium t-octylmercaptide, cadmium t-dodecyl mercaptide, cadmium n-dodecyl mercaptide of cadmium cyclopentomethylene dithiocarbamate.

Example VI

Compounds of this invention represented by cadmium stearate, cadmium laurate, cadmium phosphate, and cadmium pinanyl mercaptide composition [1] were each very lightly dusted into each of a series of 4 dram vials. All excess compound was removed in each case so that only a very thin layer was left in the bottom of each vial. Into each of the vials were introduced 5 pairs of Drosophila melanogaster (essentially homozygous, wild type) that had been lightly anesthetized. The Drosophila were allowed to crawl in the respective vials for 5 minutes and then transferred by allowing them to crawl to standard rearing medium in an 8 dram vial. The insects were then watched under a microscope to determine the extent of feeding and/or egg laying. The eggs were then observed to see if they were fertile. These compounds were found to kill part of the insects. The survivors laid very few eggs. The fertility of the reduced number of eggs laid was considerably less than normal.

Example VII

Control compounds including cadmium 2,9-p-methane mercaptides, cadmium 2-ethylhexoate, cadmium-t-octyl mercaptide, cadmium t-dodecyl mercaptide, cadmium n-dodecyl mercaptide and cadmium cyclopentamethylene dithiocarbamate were each run according to the method of Example VI. Mortality was not above normal, normal numbers of eggs were laid, and normal numbers of the eggs were fertile.

Example VIII

Compounds of this invention represented by cadmium stearate, cadmium laurate, cadmium phosphate, and cadmium pinanyl mercaptide composition were each inoculated into a coxatrocanteral joint of Perniplaneta americana (American roaches). Larger doses were lethal, smaller doses were not lethal but reduced the fertility of the roaches when later mated.

Example IX

Control compounds including cadmium 2,9-p-menthane, cadmium 2-ethylhexoate, cadmium t-octyl mercaptide, cadmium t-dodecyl mercaptide, cadmium n-dodecyl mercaptide and cadmium cyclopentomethylene dithiocarbamate were each run on American roaches accoring to the method of Example VIII. No abnormal mortality or reduction in fertility was noted.

Example X

Cadmium containing compounds were each mixed in the standard diet of houseflies (Musca domestica). The

---

[1] The cadmium pinanyl mercaptide composition referred to in this and following examples was prepared by conventional technique from a pinanyl mercaptan product that was synthesized from alpha pinene according to the method of Example I in U.S. 3,248,315.

flies were observed and the number and fertility of their eggs were determined. The results were as follows:

jecting the arthropods to the action of selected cadmium containing compounds.

TABLE

| Compounds | American roaches | | German roaches | |
|---|---|---|---|---|
| | Effect of larger doses | Effect of lower doses | Effect of larger doses | Effect of lower doses |
| Cadmium stearate | Toxic | Lowered fertility | Toxic | Lowered fertility. |
| Cadmium laurate | do | do | do | Do. |
| Cadmium phosphate | do | do | do | Do. |
| Cadmium pinanyl mercaptide composition | do | do | do | Do. |
| Control Compounds: | | | | |
| Cadmium 2,9-p-menthane | None | None | None | None. |
| Cadmium 2-ethylhexoate | do | do | do | Do. |
| Cadmium t-octyl mercaptide | do | do | do | Do. |
| Cadmium n-dodecyl mercaptide | do | do | do | Do. |
| Cadmium cyclopentamethylene dithiocarbamate | do | do | do | Do. |

| Compounds of invention | Effect larger doses | Effect lower doses |
|---|---|---|
| Cadmium stearate | Toxic | Lowered fertility. |
| Cadmium laurate | do | Do. |
| Cadmium phosphate | do | Do. |
| Cadmium pinanyl mercaptide composition | do | Do. |
| Control compounds: | | |
| Cadmium 2,9-p-menthane | None | None. |
| Cadmium 2-ethylhexoate | do | Do. |
| Cadmium t-octyl mercaptide | do | Do. |
| Cadmium n-dodecyl mercaptide | do | Do. |
| Cadmium cyclopentamethylene dithiocarbamate | do | Do. |

Example XI

Cadmium containing compounds were each mixed in the standard diet of German roaches (*Blattella germanica*) and American roaches (*Periplaneta americana*). The roaches were observed and the number and fertility of their eggs were determined. The results are given in the attached table.

These examples clearly demonstrate the utility of the claimed cadmium containing compounds in controlling arthropods by the modes of action claimed. These examples also clearly demonstrate the activity of the claimed compounds is not inherent in the cadmium moiety of the said compounds, but is dependent on the structure of the non-cadmium moiety as well.

Reasonable variation and modification are possible within the scope of the invention, the essence of which is a method for combatting arthropods comprising subjecting the arthropods to the action of selected cadmium containing compounds.

I claim:
1. A method for killing and interferring with the life processes of insects selected from the group consisting of Drosophila (fruit fly), *Perniplaneta americana* (American roach), *Blattella germania* (German roach), and *Musca domestica* (housefly), which comprises applying a killing and life interferring amount of cadmium compound selected from the group consisting of cadmium n-octyl mercaptide and cadmium 2-hydroxyethyl mercaptide to said insects.
2. A method according to claim 1 wherein the amount of cadmium-containing compound applied to the insects ranges from 0.01 to 1000 mg./kg. insect body weight.

References Cited

UNITED STATES PATENTS

| 2,288,810 | 7/1942 | Leatherman | 8—136.5 |
| 2,713,589 | 7/1955 | Radcliffe | 260—429 |
| 3,248,315 | 4/1966 | Warner et al. | 204—162 |

OTHER REFERENCES

Frear, D. E. H.: Chemical Insecticides, vol. 1, Chronica Botanica Co., 1947, p. 172.

ALBERT T. MEYERS, Primary Examiner

JAMES V. COSTIGAN, Assistant Examiner